(12) United States Patent
Choi et al.

(10) Patent No.: US 11,623,778 B1
(45) Date of Patent: Apr. 11, 2023

(54) ITEM SIZING GUIDE FOR A PACKING MACHINE

(71) Applicant: Amazon Technologies, Inc., Seattle, WA (US)

(72) Inventors: Steven Sungyong Choi, Puyallup, WA (US); Adam H. Schreiber, Commerce City, CO (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 16/986,072

(22) Filed: Aug. 5, 2020

(51) Int. Cl.
  *B65B 57/10* (2006.01)
  *B65B 57/14* (2006.01)
  *G01B 3/42* (2006.01)
  *B65B 35/10* (2006.01)

(52) U.S. Cl.
  CPC ............. *B65B 57/14* (2013.01); *B65B 35/10* (2013.01)

(58) Field of Classification Search
  None
  See application file for complete search history.

(56) References Cited

U.S. PATENT DOCUMENTS

| 2,863,269 A | * | 12/1958 | Pokras | B65B 9/02 53/555 |
| 2008/0236108 A1 | * | 10/2008 | Parmley | B65B 11/54 53/504 |
| 2015/0190312 A1 | * | 7/2015 | Yuyama | B65B 35/08 700/232 |
| 2016/0167866 A1 | * | 6/2016 | Omura | B65B 35/06 221/173 |
| 2020/0047365 A1 | * | 2/2020 | Hawkins | B65G 13/04 |
| 2022/0089309 A1 | * | 3/2022 | Takada | B65B 1/04 |

FOREIGN PATENT DOCUMENTS

GB        278836 A   * 10/1927  ............. B65B 57/14

* cited by examiner

*Primary Examiner* — Hemant Desai
*Assistant Examiner* — Tanzim Imam
(74) *Attorney, Agent, or Firm* — Eversheds Sutherland (US) LLP

(57) ABSTRACT

A dimensioning tool for a packing machine is provided. The dimensioning tool is configured to allow insertion of an item into the packing machine when the item satisfies one or more criteria. The dimensioning tool includes a first gauge and a second gauge separate from the first gauge. The first gauge is configured to restrict a first set of dimensions of the item that can be inserted into the packing machine, according to the one or more criteria. The second gauge is configured to restrict a second set of dimensions of the item that can be inserted into the packing machine, according to the one or more criteria.

18 Claims, 14 Drawing Sheets

ITEM SIZING GUIDE FOR A PACKING MACHINE

BACKGROUND

The present invention relates to a dimensioning tool (or guide) for sizing and placing items within a semi-automated packing machine.

Many facilities (e.g., warehouses, plants, distribution centers, storehouses, factories, etc.) perform various tasks to prepare items for shipment. For example, an item being prepared for shipment may transition through an inventory area, sorting area, picking area, packing area, staging area, etc., before being shipped to a customer. Facilities typically use semi-automated equipment to aid with these various tasks. For example, a facility can use a semi-automated packing machine to form packaging around an item, resulting in a package that can be shipped. In some cases, the efficiency and reliability of these semi-automated packing machines may depend in part on the size, orientation, and placement of the items within the machines.

BRIEF DESCRIPTION OF DRAWINGS

Various embodiments in accordance with the present disclosure will be described with reference to the drawings, where like designations denote like elements.

DETAILED DESCRIPTION

Embodiments describe a dimensioning tool (or guide) that can be used for placing items within a semi-automated packing machine. For example, a semi-automated packing machine within a facility may be configured to form packaging around items of various sizes and dimensions. In some cases, however, one or more items that are improperly sized for the semi-automated packing machine (e.g., the item has at least one dimension outside of an acceptable range) may transition to the semi-automated packing machine from upstream operations within the facility. In these cases, attempting to form a package around an item that is improperly sized for a semi-automated packing machine and/or improperly placed within the semi-automated packing machine can result in a defective package (e.g., the package may not be fully sealed, which can lead to damaged or missing items), impacting the efficiency of facility operations.

In one embodiment described in more detail below, a dimensioning tool is disposed in proximity to the semi-automated packing machine and is utilized to determine acceptable item sizes and/or item placements for the semi-automated packing machine. For example, the dimensioning tool can be utilized to determine if a given item has unacceptable dimensions (e.g., the item has at least one dimension outside of a predefined range) for the semi-automated packing machine. In another example, the dimensioning tool can be used to determine correct placement (or position) of an item (that has acceptable dimensions) for the semi-automated packing machine. By using the dimensioning tool described herein to determine acceptable item sizes and/or item placements for a semi-automated packing machine, embodiments can significantly reduce the occurrence of defective packages, improving the efficiency of facility operations.

Many of the following embodiments use a fulfillment center as a reference example of an environment in which the dimensioning tool described herein can be utilized to aid in the packing of items. Note that the dimensioning tool described herein is not limited to these type of environments and that the dimensioning tool can be utilized in a variety of environments (e.g., retail centers, grocery stores, food distribution centers, etc.) and for a variety of devices/apparatuses. For example, in some embodiments, the dimensioning tool can be used to aid sizing and/or placement of items for other semi-automated operations within a facility, such as sorting, staging, shipping etc. Further note that, as used herein, a dimensioning tool may also be referred to as an item sizing guide, a dimensioning guide, a two-part dimensioning gauge, a direct measurement guide, a dimensioning device, a dimensioning gauge, etc.

Figure 1:
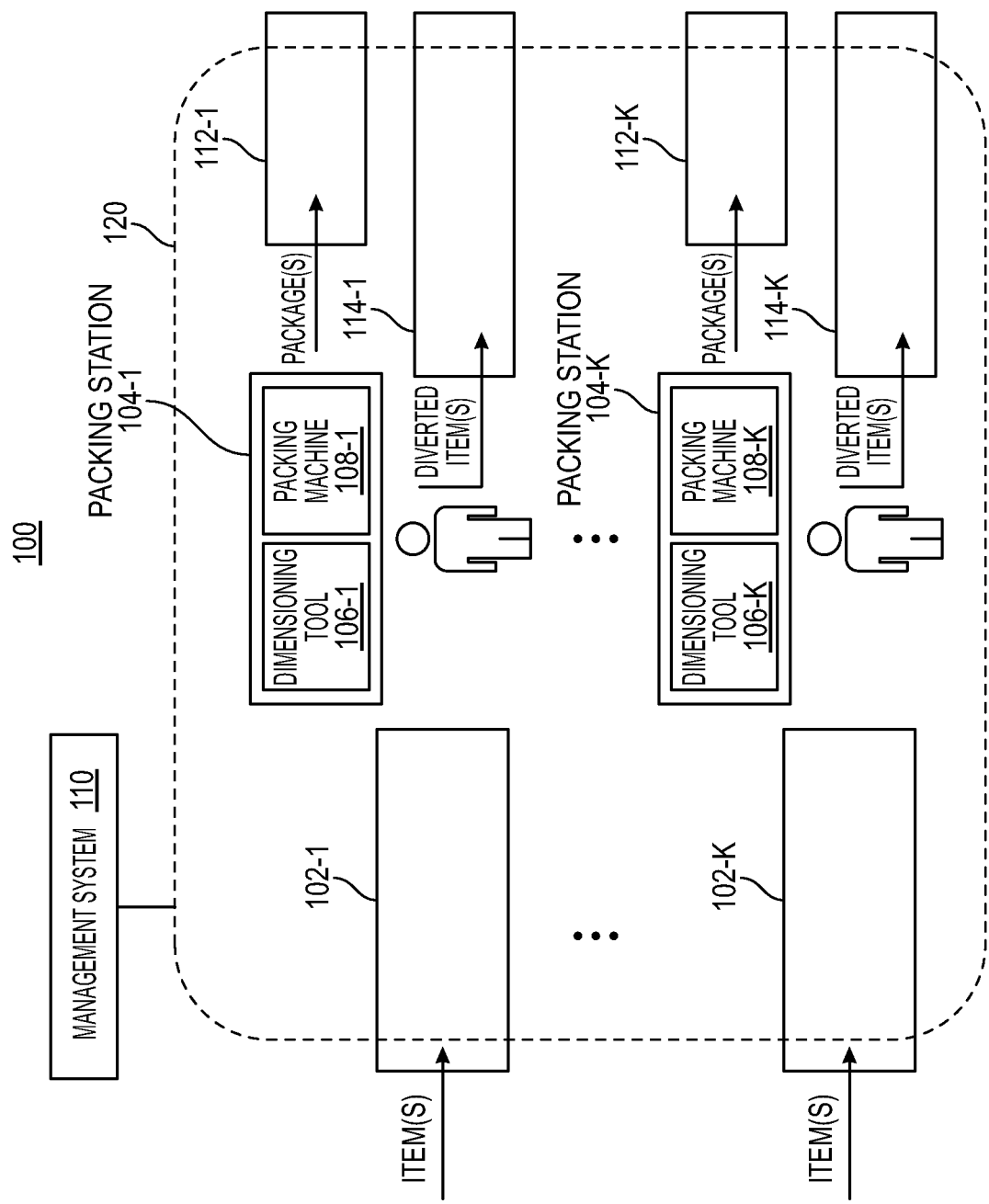
FIG. 1 is a block diagram illustrating an example facility utilizing dimensioning guide(s) for packing machines, according to one embodiment.

FIG. 1 is a block diagram illustrating an example facility 100 that utilizes one or more dimensioning tools for semi-automated packing machines, according to one embodiment. In one embodiment, the facility 100 is a fulfillment center that performs various operations (e.g., sorting, singulation, picking, packing, etc.) in order to ship items to customers.

In the depicted embodiment, the facility 100 includes a management system 110 and an equipment (or machine) area 120. The equipment area 120 is representative of various phase(s) of facility operations known to a person of ordinary skill in the art. In one example, the equipment area 120 can include one or more receiving stations to singulate disparate items as they are initially received into the facility 100. In another example, the equipment area 120 can include a sorting station to route singulated items to different packing stations (e.g., for order fulfillment). Other examples of facility operations that may take place within the equipment area 120 include, but are not limited to, staging at loading zones or other predefined regions within a facility, loading onto and/or off vehicles, and so forth.

In this particular embodiment, the equipment area 120 includes one or more junction segments 102 1-K, junction segments 112 1-K, junction segments 114 1-K, and packing stations 104 1-K (also referred to as packing systems). The junction segments 102, 112, and 114 generally represent sections of the facility 100 in which items (e.g., individual items, items within totes or containers, items within packages, etc.) are moved (or transitioned) within and/or out of the equipment area 120. The junction segments 102, 112, and 114 can have a variety of different configurations (e.g., shape, material, angle, height (or elevation), etc.) suitable for a given equipment area 120 within a facility. For example, one or more of the junction segments 102, 112, and 114 can be oriented horizontally (e.g., without an inclination) or tilted (e.g., with an inclination). In some examples, the junction segment(s) 102, 112, and 114 may be at a different height (or elevation) than other junction segment(s). In some examples, the junction segment(s) 102, 112, and 114 can have a surface shape that is substantially planar, crowned, domed, concave, convex, irregular, or any other shape or combination of shapes. Additionally, the material(s) that forms the top surface of the junction segment(s) 102, 112, and 114 may be formed of one or more of a variety of materials (e.g., metal, plastic, rubber, fabric, foam, carpet, wood, tile, etc.). In some examples, the junction segment(s) 102, 112, and 114 can include a conveyor belt or a series of conveyor belts (that may have different configurations). In general, the junction segment(s) 102, 112, and 114 can have any form factor suitable for transitioning and/or holding items, packages, totes, containers, etc.

Here, one or more items may transition to the packing stations 104 1-K on junction segments 102 1-K from other areas of the facility 100. Each packing station 104 1-K includes a respective packing machine 108 1-K, which is a semi-automated device (or machine or apparatus) that can create a package containing an item by forming packaging material (also referred to as packing material) around the item and sealing the packaging material. The packing machine 108 can form packaging material around items of varying sizes, and thus has the ability to create packages of varying sizes. The packing machine 108 can be configured with roller(s) that have packaging material wrapped around them. In some embodiments, the roller(s) (e.g., motorized roller(s)) can be configured to form (or wrap) packaging material around different sides of an item. The packing machine 108 may also be equipped with heat sealers (also referred to as heat sealing device(s), heat sealing equipment, etc.) that seal the packaging material on one side of the item to the packaging material on another side of the item using heat and/or pressure, in order to create a sealed package that includes the item. In one embodiment, the packing machine 108 forms flexible bubble-wrap packaging around one or more items. Note that this is merely an example and that the packing machine 108 can use a variety of materials (e.g., plastic, bubble wrap, paper, rubber, foam, fabric, etc.) for the packaging material.

In some embodiments, each packing machine 108 1-K may accept and process items that satisfy a (predefined) set of dimensions configured for the packing machine 108. For example, each packing machine 108 1-K may have a predefined maximum volume (e.g., predefined value (or range of values) along each dimension (x, y, and z)) that it can accept for packing an item. In one embodiment, the predefined set of dimensions for each packing machine 108 is associated with a maximum size of an item that can be packed by the packing machine 108 without resulting in a defective package caused in part by the size of the item. For example, the predefined set of dimensions configured for a packing machine 108 may be associated with a threshold level of seal quality of a package output by the packing machine 108.

Additionally or alternatively, in one embodiment, the predefined set of dimensions for each packing machine 108 is associated with a particular place (or location) within the packing machine 108 where the item can be inserted without resulting in a defective package caused in part by the placement of the item. For example, the placement location configured for a packing machine 108 may be associated with a threshold level of seal quality of a package output by the packing machine 108.

In one embodiment, the management system 110 may route a given item to one of the packing stations 104 1-K (e.g., via a respective junction segment 102) based in part on information associated with the item. Such information can include, for example, the type of item, the item's destination, the item's dimensions (and volume), the item's orientation, etc. In some cases, the management system 110 can receive the information associated with an item from one or more devices within the facility 100 that are located upstream from the packing station(s) 104-1. These upstream devices can include, for example, cameras, dimensioning cameras, barcode readers, and the like. In a particular embodiment, identifying information (e.g., barcode) on the item may be scanned and transmitted to the management system 110. The management system 110 can then use the identifying information to determine the type of item and the item's dimensions (e.g., in a database), and route the item to one of the packing stations 104 1-K, based in part on the item's dimensions.

In some cases, one or more of the items that are routed to a given packing station 104 may be improperly sized (e.g., have at least one dimension outside of an acceptable range) for the packing machine 108 at that packing station 104. In one example, this can occur due to incorrect information (e.g., item type, dimensions, weight, etc.) for the item being stored in a database and retrieved by the management system 110. In another example, the improper routing of an item can occur due to missing information for the item (e.g., identifying information for the item may not have been scanned upstream). In yet another example, the improper routing of an item can occur due to an error that occurred at one or more upstream stations (e.g., the item may have been accidently picked and routed to the wrong packing station).

In some cases, a user (or associate) that receives an improperly sized item at a packing station 104 may attempt to feed the item into the packing machine 108 at the packing station 104, which in turn can reduce the quality of a package formed (or created) by the packing machine 108. For example, if an associate attempts to pack an item that cannot fit into the packaging material (e.g., the item's volume is outside of an acceptable volume), this can result in a defective package seal. The defective package seal can be caused by at least one of a misalignment, a crimp error, incomplete heat seal marks, item exceeding a maximum size, etc. In some cases, even if an item is correctly sized (e.g., has acceptable dimensions and volume), the improper placement of the item into the packing machine 108 can cause a defective package to be formed. For example, items that are irregularly shaped, such as obtuse and elongated items may have to placed into the packing machine 108 in a certain orientation and/or position in order for the packing machine 108 to create a successful package seal (e.g., meeting a threshold level of seal quality).

In embodiments described herein, each packing station 104 1-K within the facility 100 is equipped with a respective dimensioning tool 106 1-K. The dimensioning tool 106 at a packing station 104 is configured to constrain the dimensions of items to those that can be safely and successfully packaged by the packing machine 108 at the packing station 104. That is, the dimensioning tool 106 can exclude items whose dimensions will lead to a package seal failure by the packing machine 108.

In one embodiment, the dimensioning tool 106 allows insertion of an item into the packing machine when the item satisfies a predefined set of dimensions associated with a threshold level of seal quality (configured for the packing machine). In some cases, the threshold level of seal quality for a given packing machine 108 may be defined as a level of seal quality of a package output by the package machine, such that the package does not include at least one of a predefined set of seal defects (e.g., horizontal seal defect, crimp error, misalignment, etc.).

As described below, in one particular embodiment, the dimensioning tool 106 includes two two-dimensional (2D) gauges that collectively constrain the length, width, and height of items that can be packed into the packing machine in accordance with one or more criteria (e.g., a set of maximum dimensions associated with a predefined threshold of seal quality). In some embodiments, each dimensioning tool 106 at a packing station 104 is installed (or mounted) in a fixed position optimized for the packing machine 108 at that packing station 104. In other embodiments, the dimensioning tool 106 can be placed in different locations for a packing machine 108, e.g., if the packing machine 108 is modified to process different sized items.

A user at a given packing station 104 can use the dimensioning tool 106 at the packing station 104 to determine whether to feed an item into the packing machine 108 at the packing station 104 and/or the manner (e.g., orientation and/or placement) in which to feed the item into the packing machine 108. If an item can fit within the dimensioning tool 106, then this indicates that the item can be packed by the packing machine 108 (e.g., without resulting in a defective package due to a defective seal). As shown in FIG. 1, items that are fed into the packing machines 108 1-K may exit the packing machines 108 1-K as packages (or packed items). The packages can then transition away from the packing stations 104 1-K via junction segments 112 1-K.

On the other hand, if an item cannot fit within the dimensioning tool 106, then this indicates that the item should not be packed by the packing machine 108 (e.g., since packing that item can lead to a defective package). As shown in FIG. 1, items that cannot fit into the packing machine can be set aside and transitioned away (or diverted) from the packing stations 104 1-K via junction segments 114 1-K. The diverted items may be sent to another station in the facility 100 for (re)processing, which can include, for example, flagging the items to indicate they have been rejected, (re)scanning the items, updating the dimensions for the items, updating packing recommendations for the items, etc.

Figure 2A:
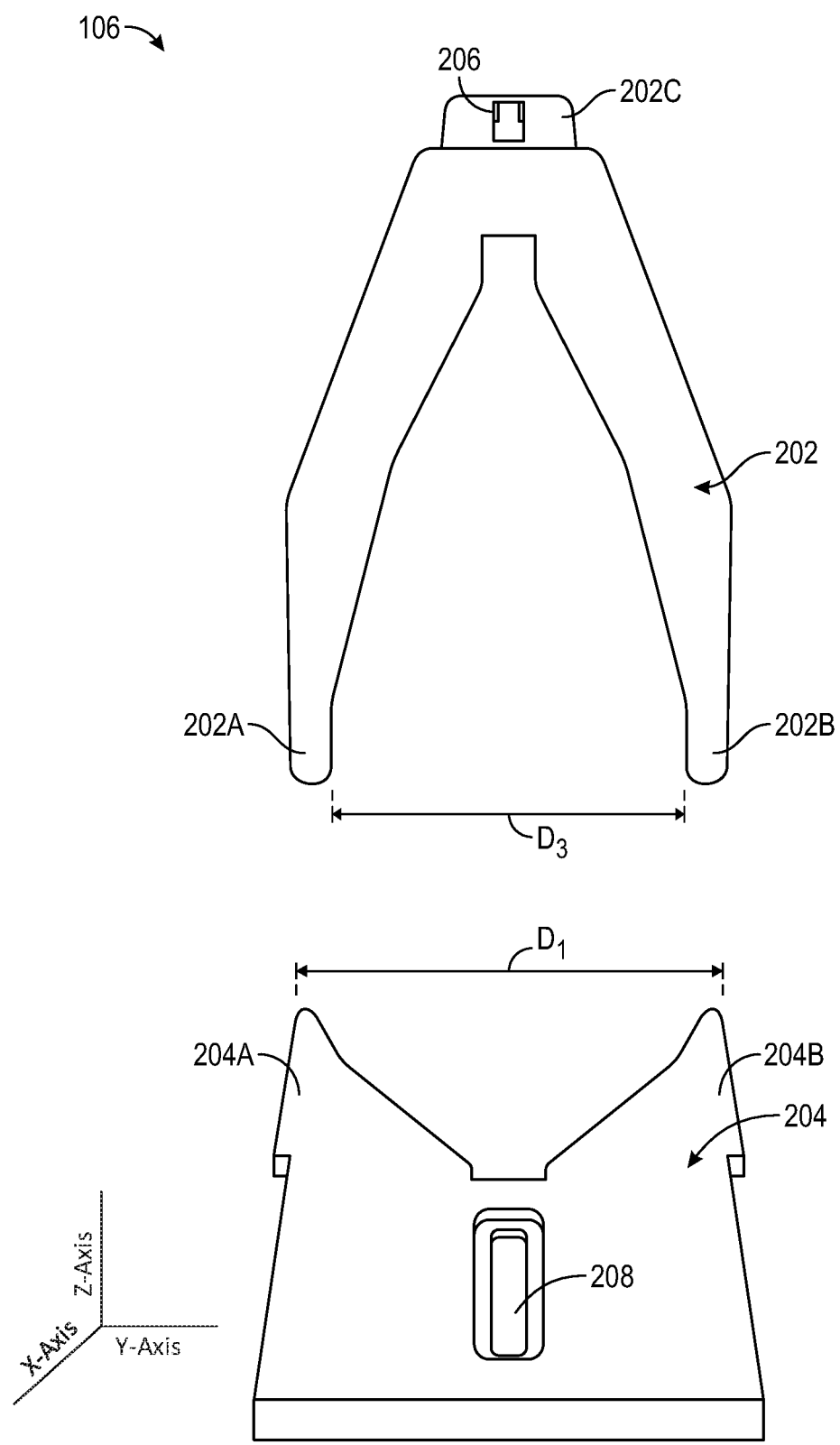
FIG. 2A shows a front perspective view of a dimensioning tool, according to one embodiment.
Figure 2B:
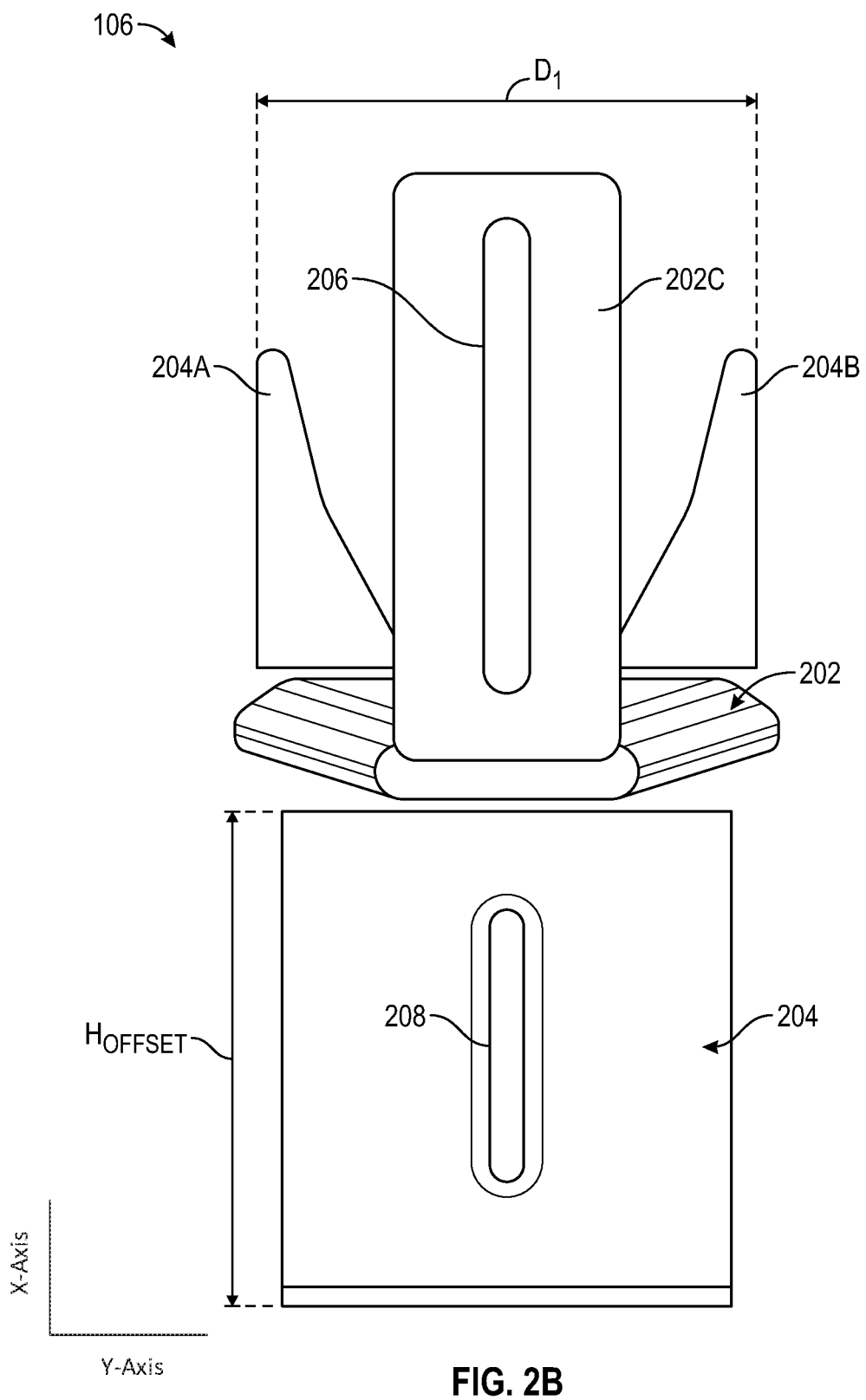
FIG. 2B shows a top perspective view of a dimensioning tool, according to one embodiment.
Figure 2C:
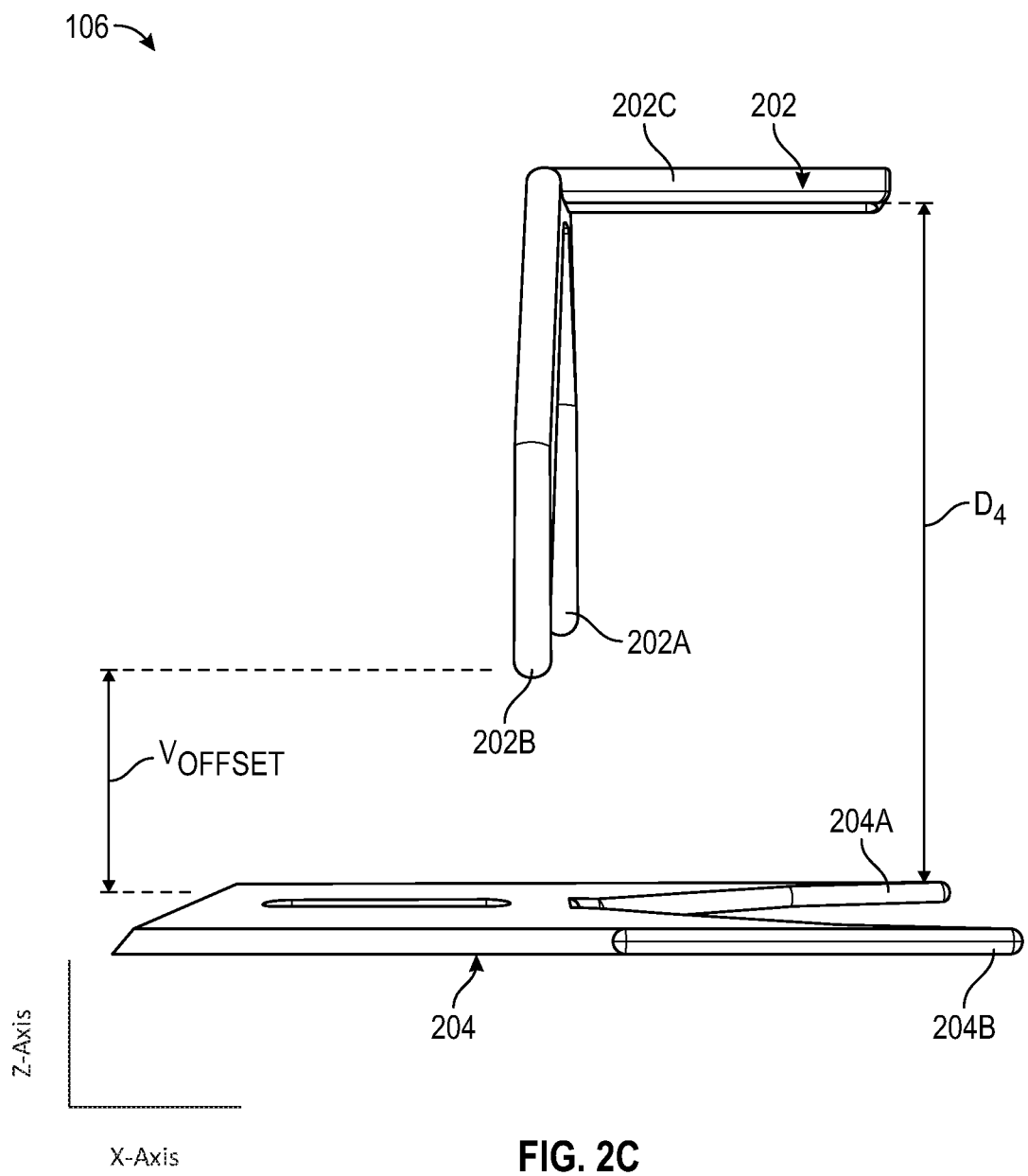
FIG. 2C shows a side perspective view of a dimensioning tool, according to one embodiment.

FIGS. 2A-2C depict different views of an example dimensioning tool 106, according to one embodiment. In particular, FIGS. 2A-2C show a front perspective view, a top perspective view, and a side perspective view, respectively, of the dimensioning tool 106. The dimensioning tool 106 includes a (first) gauge 202 and a (second) gauge 204, each of which can indicate whether an item is improperly sized (e.g., oversized) for a packing machine 108 and/or improperly placed within a packing machine 108, in order to reduce (or even prevent) package seal failures.

In the embodiment shown in FIGS. 2A-2C, the gauge 202 is a single-piece structure with portions (or members) 202A, 202B, and 202C. Portion 202C is a horizontal (or flat) portion of the gauge 202 (e.g., in the x-y plane) and includes a slot 206 for mounting (or attaching) (e.g., via screws, bolts, brackets, etc.) the gauge 202 to a location of the packing machine 108. As described below in one embodiment, the gauge 202 is mounted to a (first) fixed location at the in-feed of the packing machine 108. Portions 202A and 202B are parallel to each other in a vertical plane and extend downward (e.g., in the vertical (z) direction) from an end of portion 202C towards gauge 204. Here, portions 202A and 202B have a pronged structure. Note, however, that the gauge 202 may have a different structure in other embodiments. The gauge 202 can be formed of one or more of a variety of materials (e.g., metal, plastic, foam, rubber, wood, tile, etc.).

Note that although FIGS. 2A-2C show the gauge 202 as a single-piece structure, in other embodiments, the gauge 202 can be formed with multiple pieces. For example, the gauge 202 can include a two-piece structure with portion 202C as a first piece and portions 202A and 202B as a second piece. In another example, the gauge 202 can include a three-piece structure with portion 202C as a first piece, portion 202A as a second piece, and portion 202C as a third piece. The gauge 202 can be built using a variety of tools and methods known to those of ordinary skill in the art, including, for example, 3D printing.

As also shown in FIGS. 2A-2C, the gauge 204 is a single-piece structure with portions (or members) 204A and 204B. The gauge 204 also includes a slot 208 for mounting (or attaching) (e.g., via screws, bolts, brackets, etc.) the gauge 204 to a location of the picking machine 108. As described below, in one embodiment, the gauge 204 is mounted to a (second) fixed location at the in-feed of the picking machine 108. The portions 204A and 204B are parallel to each other in the horizontal (x-y) plane and extend towards the gauge 202 in the x direction from an end of the gauge 204. Similar to gauge 202, portions 204A and 204B of gauge 204 have a pronged structure. Note, however, that in other embodiments, the gauge 202 may have a different structure.

The gauge 204 can be formed of one or more of a variety of materials (e.g., metal, plastic, foam, rubber, wood, tile, etc.). The gauge 204 can be formed with the same set of materials as the gauge 202 or formed with a different set of materials. Similar to gauge 202, note that although FIGS. 2A-2C show the gauge 204 as a single-piece structure, in other embodiments, the gauge 204 can be a multi-piece structure. The gauge 204 can be built using a variety of tools and methods known to those of ordinary skill in the art, including, for example, 3D printing.

In one embodiment, the gauge 202 and the gauge 204 collectively constrain what a user (or associate) can put into a three-dimensional (3D) space. For example, the gauge 202 and the gauge 204 can define the maximum dimensions (e.g., height, width, and length) of an item that can go inside of the packing machine 108. As noted, these dimensions may be the maximum dimensions of an item that can be packed by the packing machine 108 without resulting in a defective package (e.g., due to a seal failure). That is, the maximum dimensions may be associated with a threshold level of seal quality configured for the packing machine 108. Additionally, the gauge 202 and the gauge 204 define the manner (e.g., placement) in which an item can be loaded into the packing machine 108 (e.g., for items that satisfy the maximum dimensions). Here, the placement location configured for the packing machine 108 may also be associated with a threshold level of seal quality configured for the packing machine 108.

The gauge 204 is configured to constrain the dimensions of an item along two dimensions (e.g., in the x-y plane). In particular, the gauge 204 defines a maximum dimension $D_1$ (along the y-axis) that corresponds to a width across the surface of gauge 204. As shown, $D_1$ extends from an outer end of portion 204A to an outer end of portion 204B (FIG. 2A). Although not shown in FIGS. 2A-2C, the gauge 204 also defines a maximum dimension $D_2$ (along the x-axis) that corresponds to a distance between a first location along a length (x-axis) of gauge 204 and a second location along a same (x) axis as the gauge 204. Note $D_2$ is described in more detail below with respect to FIG. 3. The gauge 202 defines a maximum dimension $D_3$ (along the y-axis) that corresponds to a width between portions 202A and 202B of gauge 202. As shown in FIG. 2A, $D_3$ extends between ends of portions 202A and 202B of the gauge 202 (FIG. 2A). The gauge 202 also defines a maximum dimension $D_4$ (along the z-axis) that extends between portion 202C of gauge 202 and a surface of gauge 204 (FIG. 2C).

Note that the maximum dimensions $D_1$ and $D_2$ can correspond to different dimensions of an item depending on how a given item is oriented with respect to the dimensioning tool 106. For example, the maximum dimension $D_1$ can correspond to the item's width and the maximum dimension $D_2$ can correspond to the item's length, or vice versa. Similarly, the maximum dimensions $D_3$ and $D_4$ can correspond to different dimensions of an item depending on how a given item is oriented with respect to the dimensioning tool 106. For example, the maximum dimension $D_3$ can correspond to an item's height and the maximum dimension $D_4$ can correspond to an item's width, or vice versa.

The gauges 202 and 204 may be mounted in different fixed locations on a packing machine 108 in order to configure the maximum dimensions $D_1$, $D_2$, $D_3$, and $D_4$ for the dimensioning tool 106. In the embodiment depicted in FIGS. 2A-2C, the gauge 202 and the gauge 204 may be mounted in different fixed locations, such that the gauge 204 and the gauge 202 are vertically and horizontally offset from each other. For example, the gauges 202 and 204 are mounted to the packing machine 108 in different locations (e.g., in a vertical (x-z) plane) in order to create a vertical offset (VOffset) between the ends of the portions 202A and 202B of the gauge 202 and a surface of the gauge 204 (FIG. 2C). Similarly, the gauges 202 and 204 are mounted to the packing machine 108 in different locations (e.g., in a horizontal (x-y) plane) in order to create a horizontal offset (HOffset) between gauge 204 and gauge 202.

Figure 3:
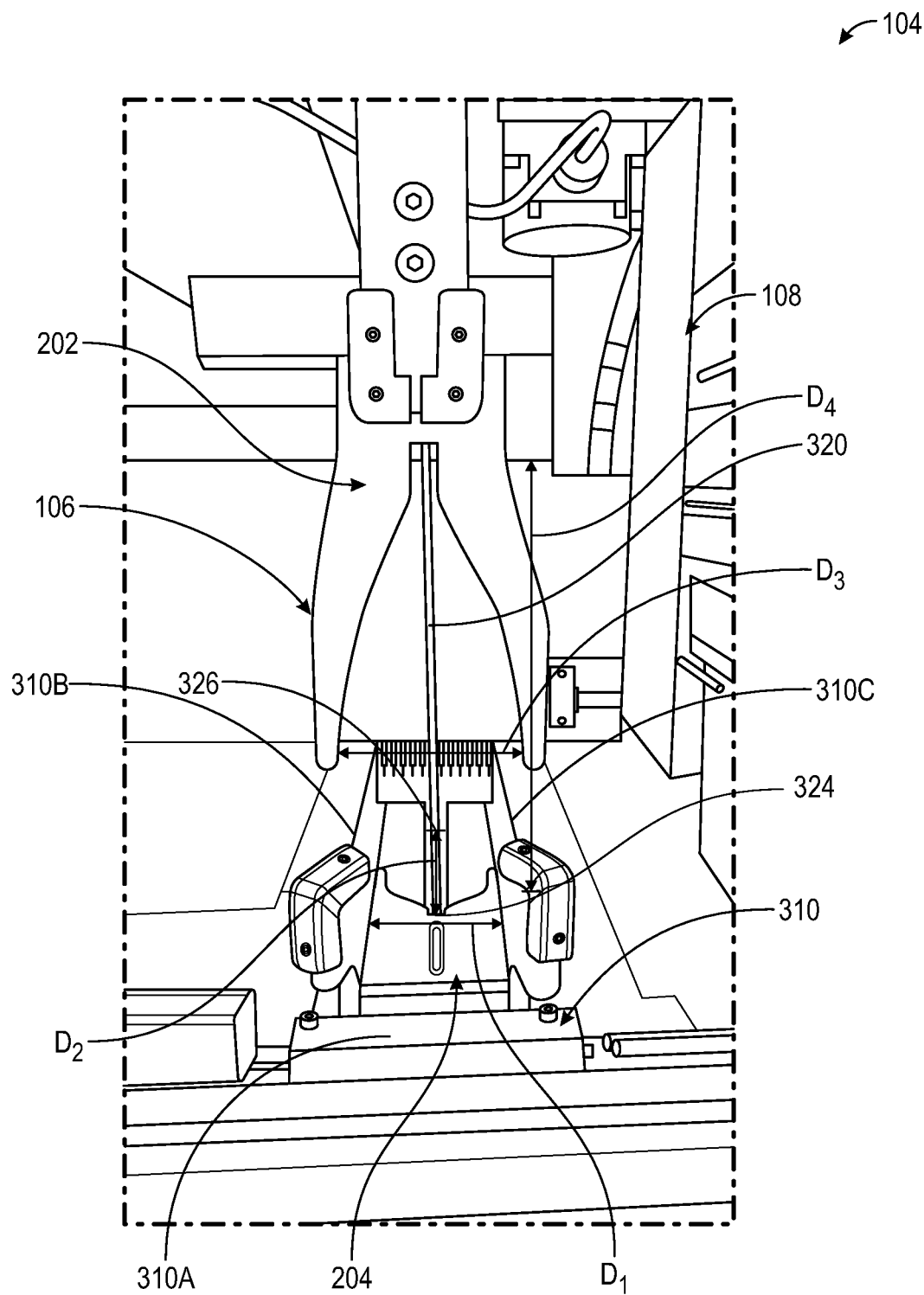
FIG. 3 illustrates an example of a dimensioning tool within a packing station, according to one embodiment.

FIG. 3 illustrates an example of a dimensioning tool 106 located at a packing machine 108 of a packing station 104, according to one embodiment. As shown, the packing machine 108 includes an in-feed tray 310 for loading (or feeding or placing) items into the packing machine 108. The in-feed tray 310 includes a bottom surface 310A, an in-feed bracket (or guide) 310B, and an in-feed bracket (or guide) 310C. Here, when an item is placed into the in-feed tray 310, the packing machine 108 can form packaging material around different sides of the item. The packing machine 108 may use heat sealers to seal the packaging material on one side of the item to the packaging material on the other side of the item to create a sealed package.

In this embodiment, the gauge 202 of the dimensioning tool 106 is disposed above the in-feed tray 310 (e.g., mounted to a first fixed position of the packing machine 108) and the gauge 204 is disposed on the bottom surface 310A of the in-feed tray 310 (e.g., mounted to a second fixed position of the packing machine 108).

As noted, the dimensioning tool 106 depicted in FIG. 3 can constrain the dimensions of an item that can be put into the packing machine 108 (via the in-feed tray 310) in order to reduce the likelihood of a defective package (e.g., due to a package seal failure). Here, for example, gauge 204 of the dimensioning tool 106 constrains the item's length and width (e.g., to below $D_1$ and $D_2$) and gauge 202 of the dimensioning tool 106 constrains the item's height and width (e.g., to below $D_3$ and $D_4$). In this embodiment, $D_2$ extends (along the x-axis in a horizontal (x-y) plane) from a first location (or junction) 324 between portions 204A and 204B to a second location 326 along the x-axis of the in-feed tray 310. Here, the second location 326 corresponds to the intersection of bar 320 of the packing machine 108 with the in-feed tray 310. The bar 320 may define an outer (e.g., bottom) seal of a package formed by the packing machine 108.

Note that while FIGS. 2 and 3 illustrate maximum dimensions $D_1$ and $D_2$ for gauge 204, the gauge 204 may define different maximum dimensions (of an item that can be packed by the packing machine 108) along the same respective axes as $D_1$ and $D_2$. For example, the gauge 204 can define different maximum dimensions (along the same (y) axis as $D_1$) between the ends of portions 204A and 204B for different points within $D_2$. Similarly, the gauge 204 can define different maximum dimensions (along the same (x) axis as $D_2$) between the locations 324 and 326 for different points within $D_1$. Note that $D_1$ may be the same as $D_3$ or different than $D_3$.

Likewise, while FIGS. 2 and 3 illustrate maximum dimensions $D_3$ and $D_4$ for gauge 202, the gauge 202 may define different maximum dimensions (of an item that can be packed by the packing machine 108) along the same respective axes as $D_3$ and $D_4$. For example, the gauge 202 can define different maximum dimensions (along the same (y) axis as $D_3$) between portions 202A and 202B for different points within $D_4$. Similarly, the gauge 202 can define different maximum dimensions (along the same (z) axis as $D_4$) between portion 202C and the surface of gauge 204 for different points within $D_3$.

Figure 4A:
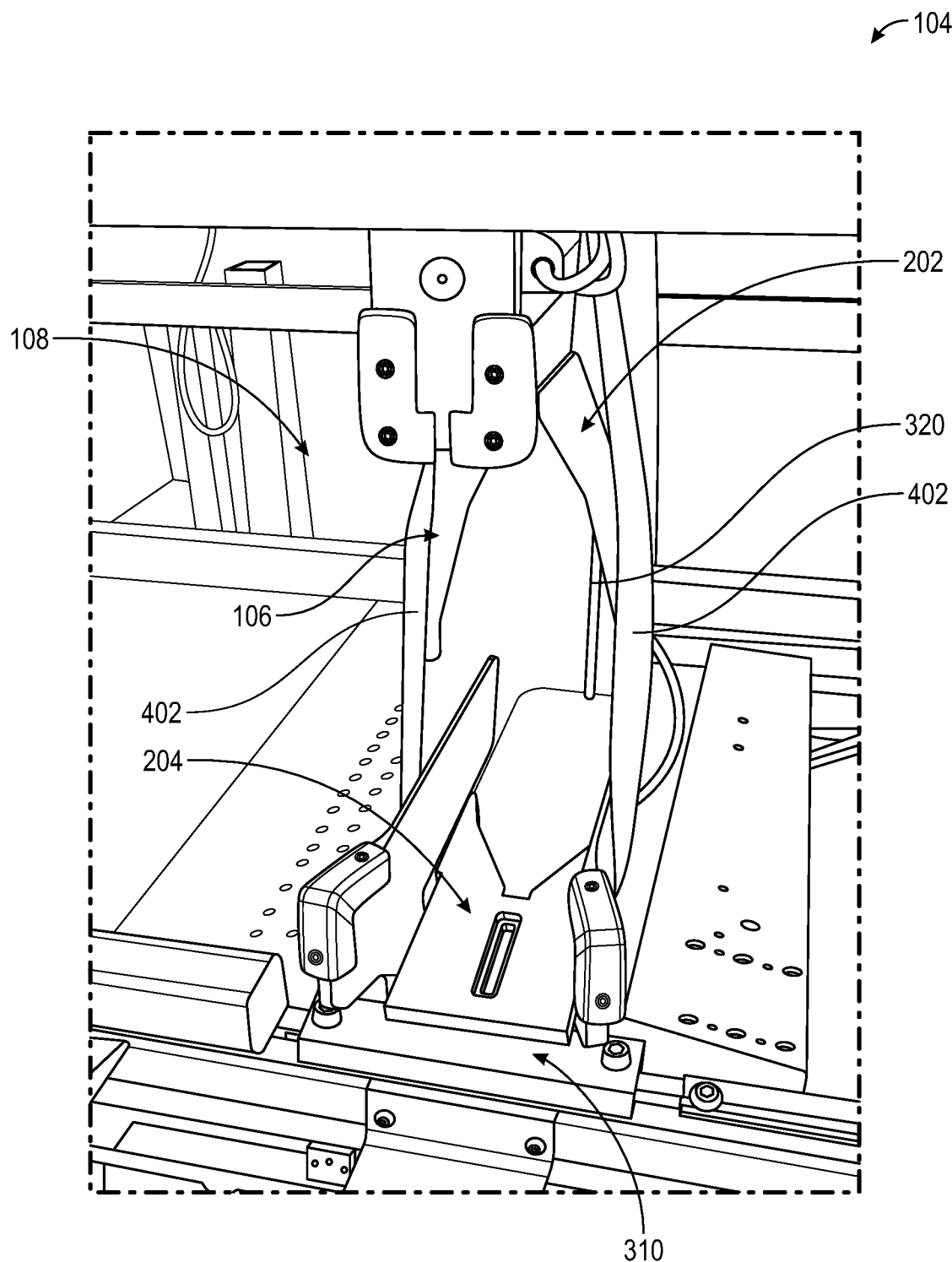
FIGS. 4A-4D illustrate an example sequence of a using a dimensioning tool within a packing station, according to one embodiment.

FIGS. 4A-4D illustrate an example sequence for using a dimensioning tool 106 to place an item in a packing machine 108, according to one embodiment. Referring to FIG. 4A, the packing machine 108 is configured to accept items from a user and form packaging material 402 around the item(s) to create a package with the item (e.g., for shipping to a customer). As shown, the packing machine 108 can form packaging material 402 around different sides of the in-feed tray 310 where an item would be placed. In some embodiments, the packaging material 402 may wrap around the bar 320, forming a U-shaped channel that defines the bottom of a package created by the packing machine 108. Here, a user (or associate) may initially check that the in-feed tray 310 is clear and that the packing machine 108 is ready to receive an item for processing.

Figure 4B:
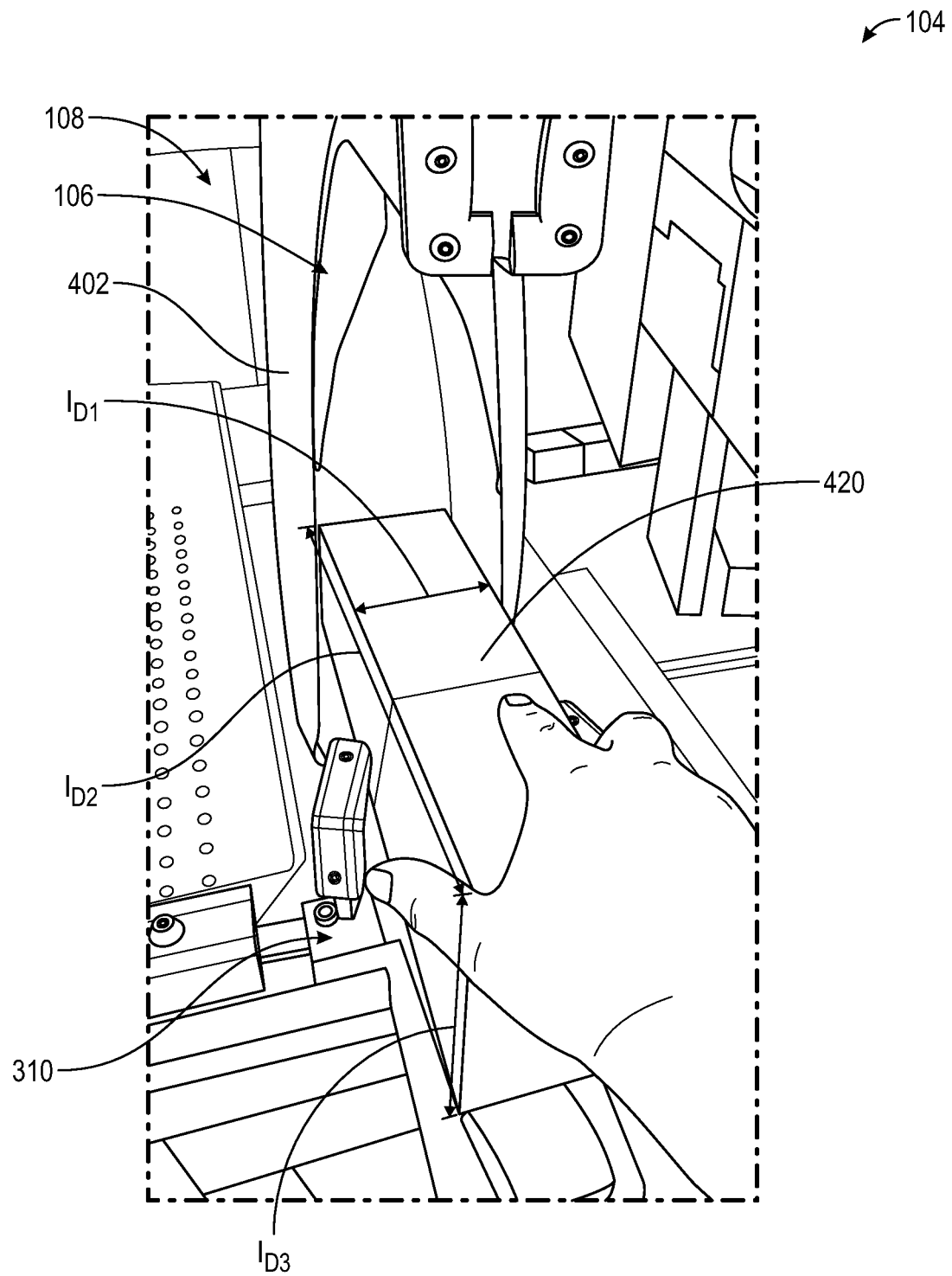

As shown in FIG. 4B, at a subsequent point in time, the user can retrieve an item 420 from the junction segment 102, scan the item 420, and place the item 420 on the in-feed tray 310. Here, the item 420 has dimensions $I_{D1}$, $I_{D2}$, and $I_{D3}$. Assuming the item 420 was laying flat on a surface, $I_{D1}$ may refer to the height of the item 420, $I_{D2}$ may refer to the (draw) length of the item 420, and $I_{D3}$ may refer to the width of the item 420. In FIG. 4B, the item 420 is placed on the in-feed tray 310, such that $I_{D1}$ is along the same axis (e.g., y-axis) as $D_1$ and $D_3$, $I_{D2}$ is along the same axis (e.g., x-axis) as $D_2$, and $I_{D3}$ is along the same axis (e.g., z-axis) as $D_4$. With the item 420 in this orientation, the user may attempt to slide the item 420 into the packing machine 108 via the in-feed tray 310.

Figure 4C:
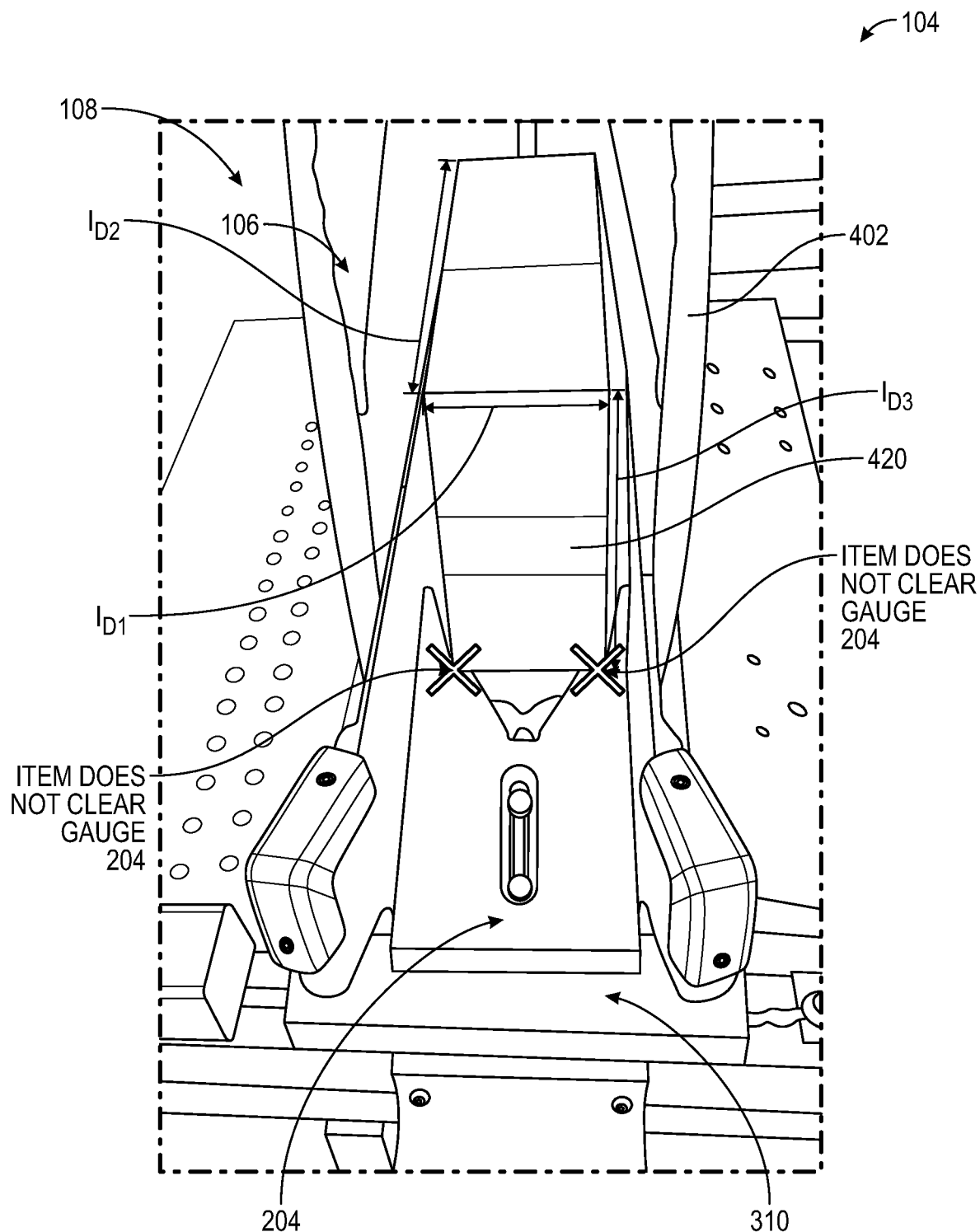

However, as shown in FIG. 4C, when the user attempts to place the item 420 into the packing machine, the item 420 does not clear the bottom gauge 204 (e.g., the item 420 overlaps a portion of the gauge 204). In particular, the item dimension $I_{D2}$ is not within a maximum dimension defined by the gauge 204 (e.g., along the same (x) axis as $D_2$) for the item dimension $I_{D1}$ (along the same (y) axis as $D_1$). Because the item 420 does not clear the bottom gauge 204, this indicates that the item 420 is improperly sized and/or improperly placed within the packing machine 108 in order for the packing machine 108 to successfully create a package (e.g., without a seal failure). Based on this indication, the user may can attempt to re-orient the item 420 (e.g., by re-aligning the dimensions of the item with respect to the dimensioning tool 106).

Figure 4D:
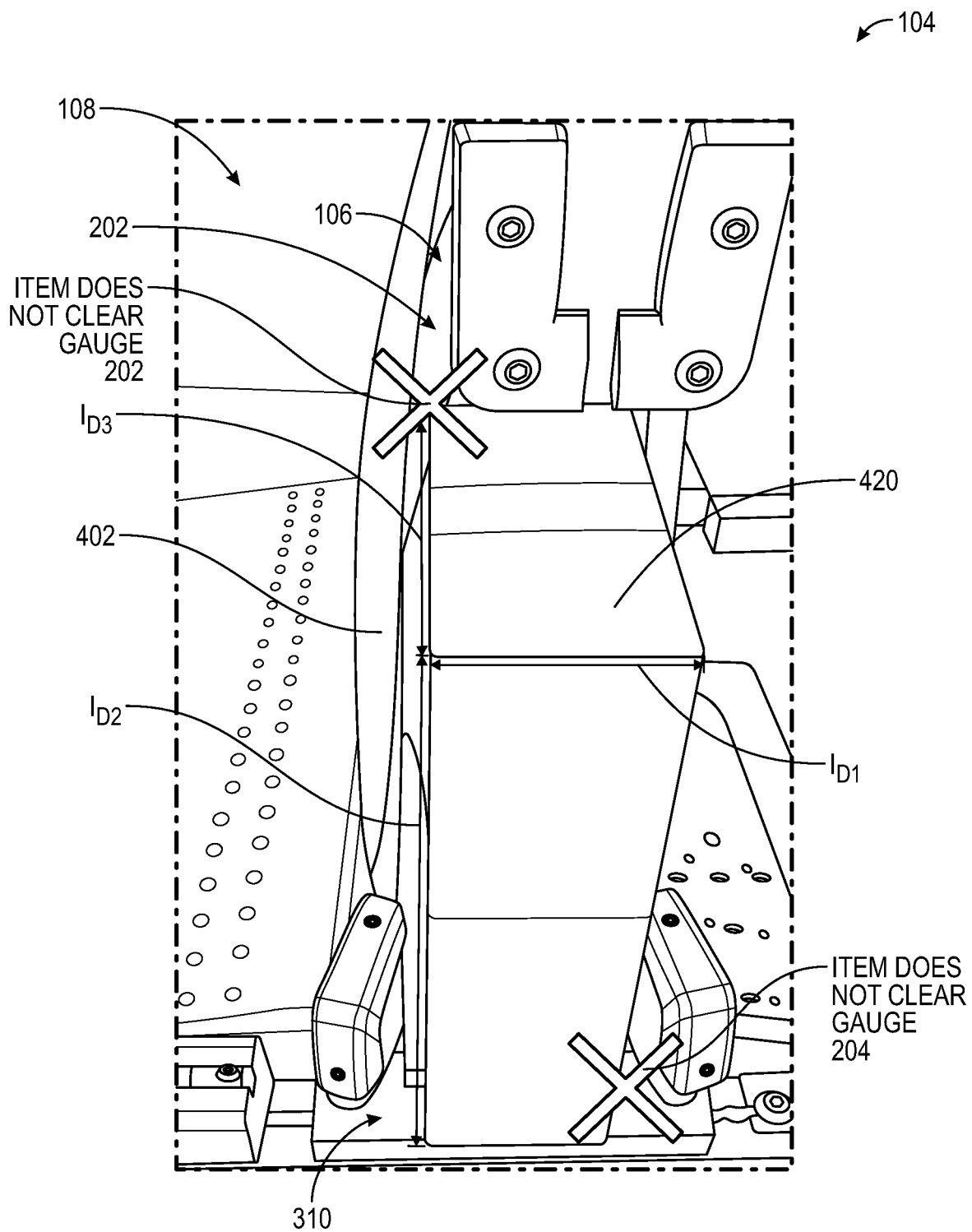

For example, as shown in FIG. 4D, the user re-orients the item 420, such that $I_{D1}$ is along the same (y) axis as $D_1$ and $D_3$, $I_{D2}$ is along the same (z) axis as $D_4$ (as opposed to $D_2$), and $I_{D3}$ is along the same (x) axis as $D_2$ (as opposed to $D_4$). Here, with the item 420 in this orientation, the item 420 does not clear the gauge 202 and the gauge 204. For example, the item dimension $I_{D1}$ is not within a maximum dimension defined by the gauge 204 (e.g., along the same (y) axis as $D_1$) for the item dimension $I_{D3}$ (along the same axis as $D_2$), and the item dimension $I_{D2}$ is not within a maximum dimension defined by the gauge 202 (e.g., along the same (z) axis as $D_4$) for the item dimension $I_{D1}$ (along the same (y) axis as $D_3$). Based on this indication, the user can determine that placing the item 420 into the packing machine 108 may result in a defective package, and may divert the item 420 via junction segment 114 for re-processing.

Figure 5A:
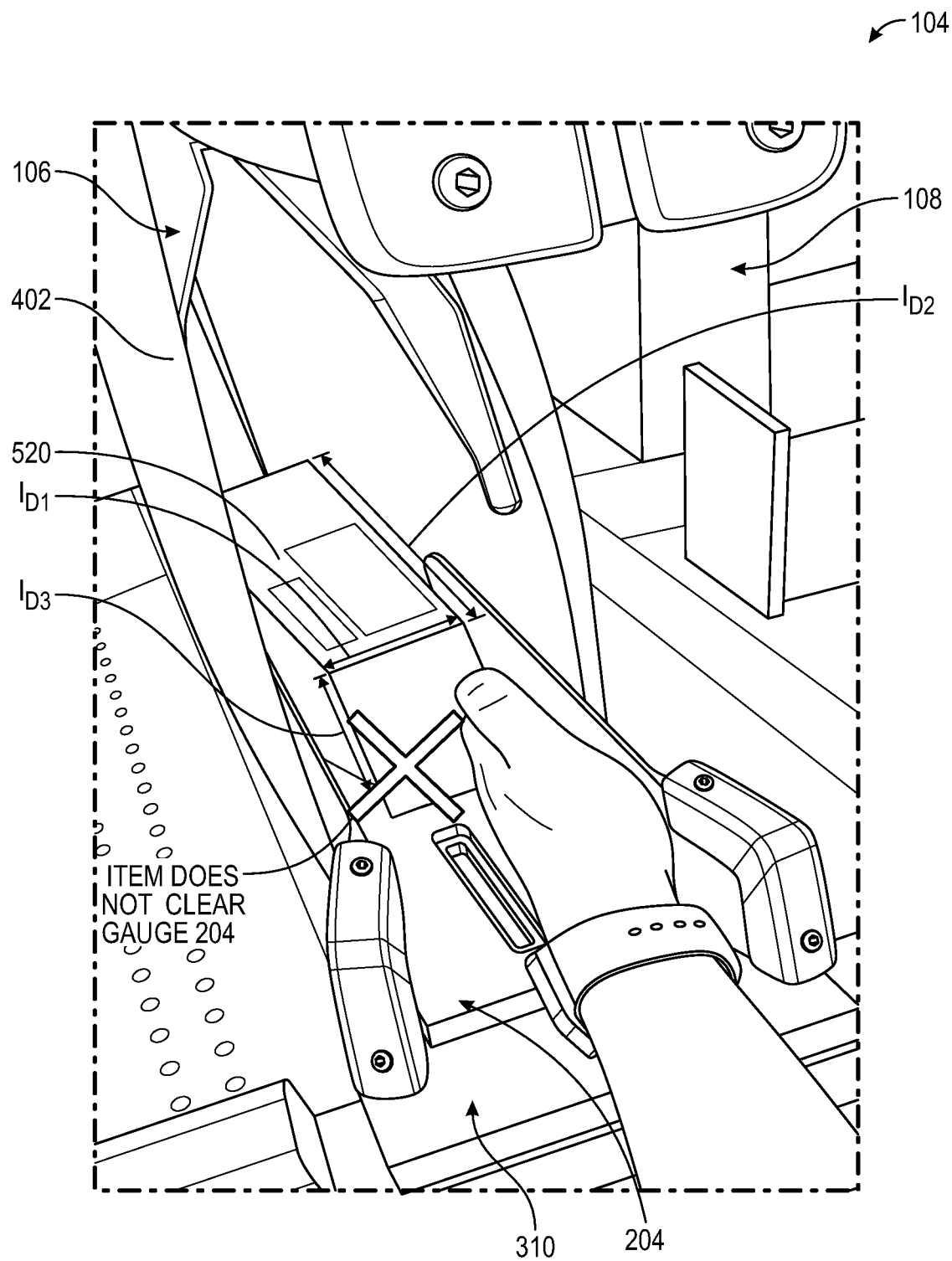
FIGS. 5A-5B illustrate another example sequence of a using a dimensioning tool within a packing station, according to one embodiment.
Figure 5B:
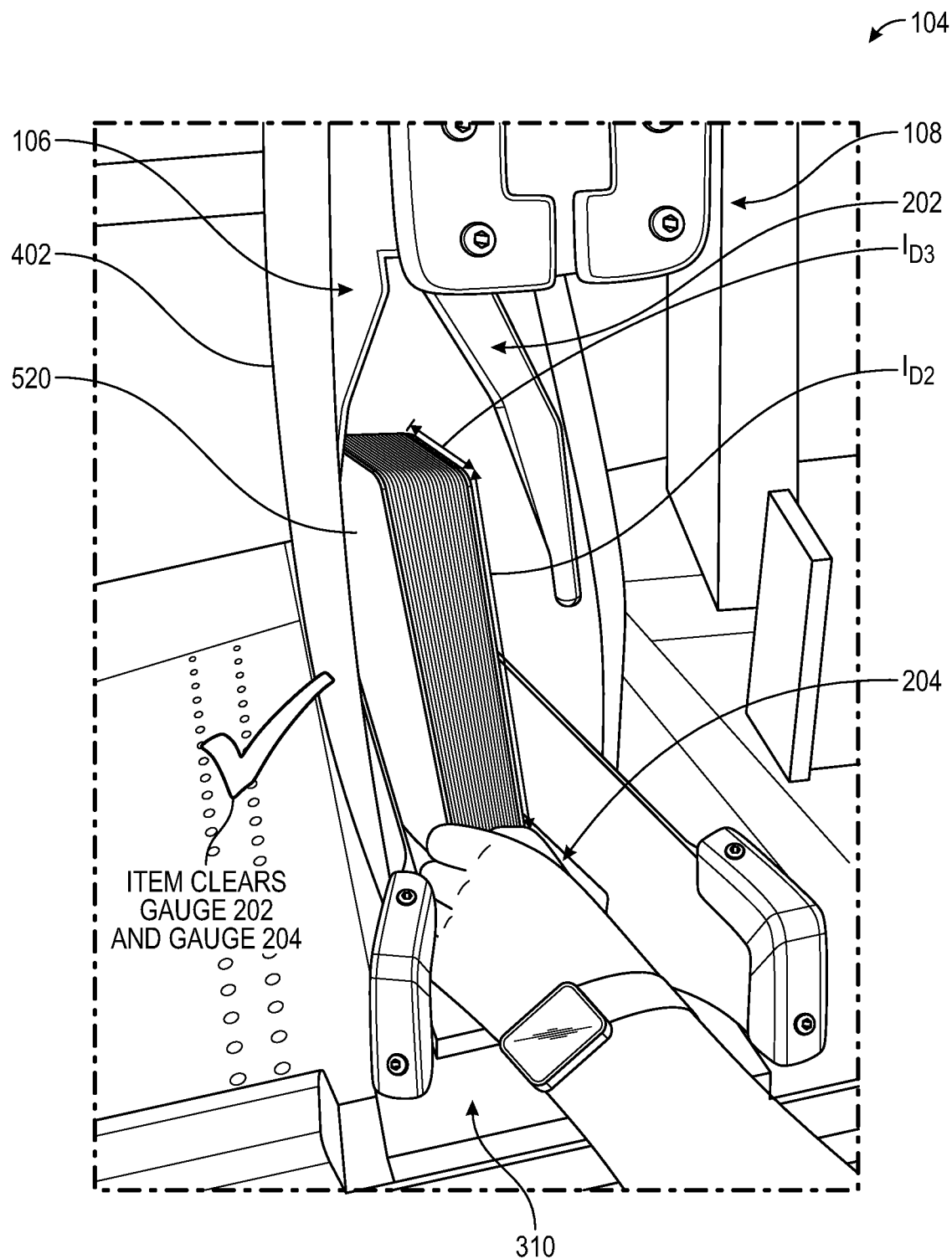

FIGS. 5A-5B illustrate another example sequence for using a dimensioning tool 106 to place an item in a packing machine 108, according to one embodiment. Here, in FIG. 5A, a user places the item 520 onto the in-feed tray 310, such that $I_{D1}$ is along the same (y) axis as $D_1$ and $D_3$, $I_{D2}$ is along the same (x) axis as $D_2$, and $I_{D3}$ is along the same (z) axis as $D_4$. However, the item 520 does not clear gauge 204, e.g., due in part to the item dimension $I_{D1}$ being outside a maximum dimension defined by the gauge 204 (e.g., along the same (y) axis as $D_1$) for the item dimension ha (along the same (x) axis as $D_2$).

Based on this indication, as shown in FIG. 5B, the user re-orients the item 520, such that $I_{D2}$ is along the same (z) axis as $D_4$ (as opposed to $D_2$) and $I_{D3}$ is along the same (x) axis as $D_2$ (as opposed to $D_4$). Here, in this orientation, the item 520 clears both gauges 202 and 204, indicating that the packing machine 108 can process the item 520 without forming a defective package.

Figure 6A:
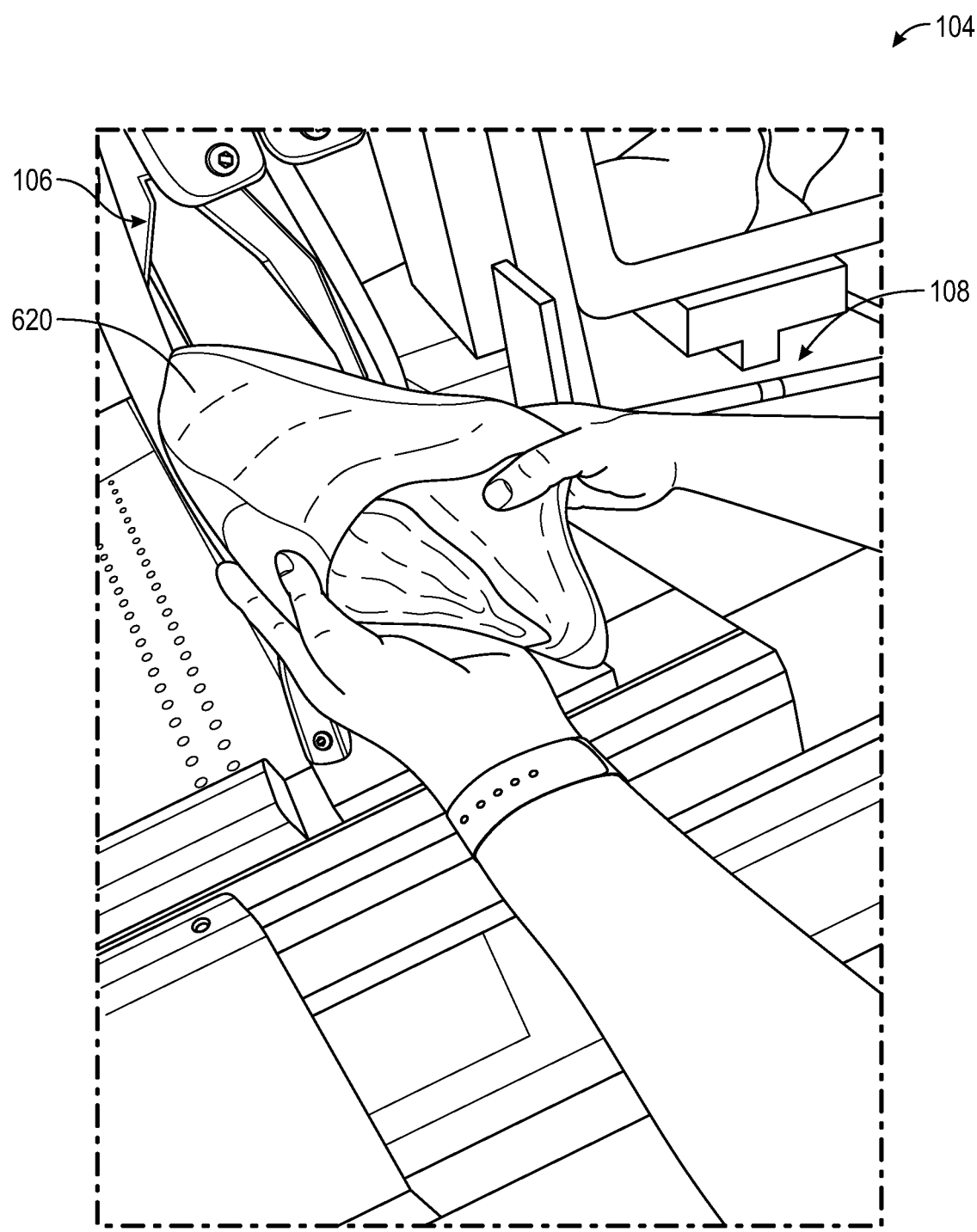
FIGS. 6A-6B illustrate yet another example sequence of a using a dimensioning tool within a packing station, according to one embodiment.
Figure 6B:
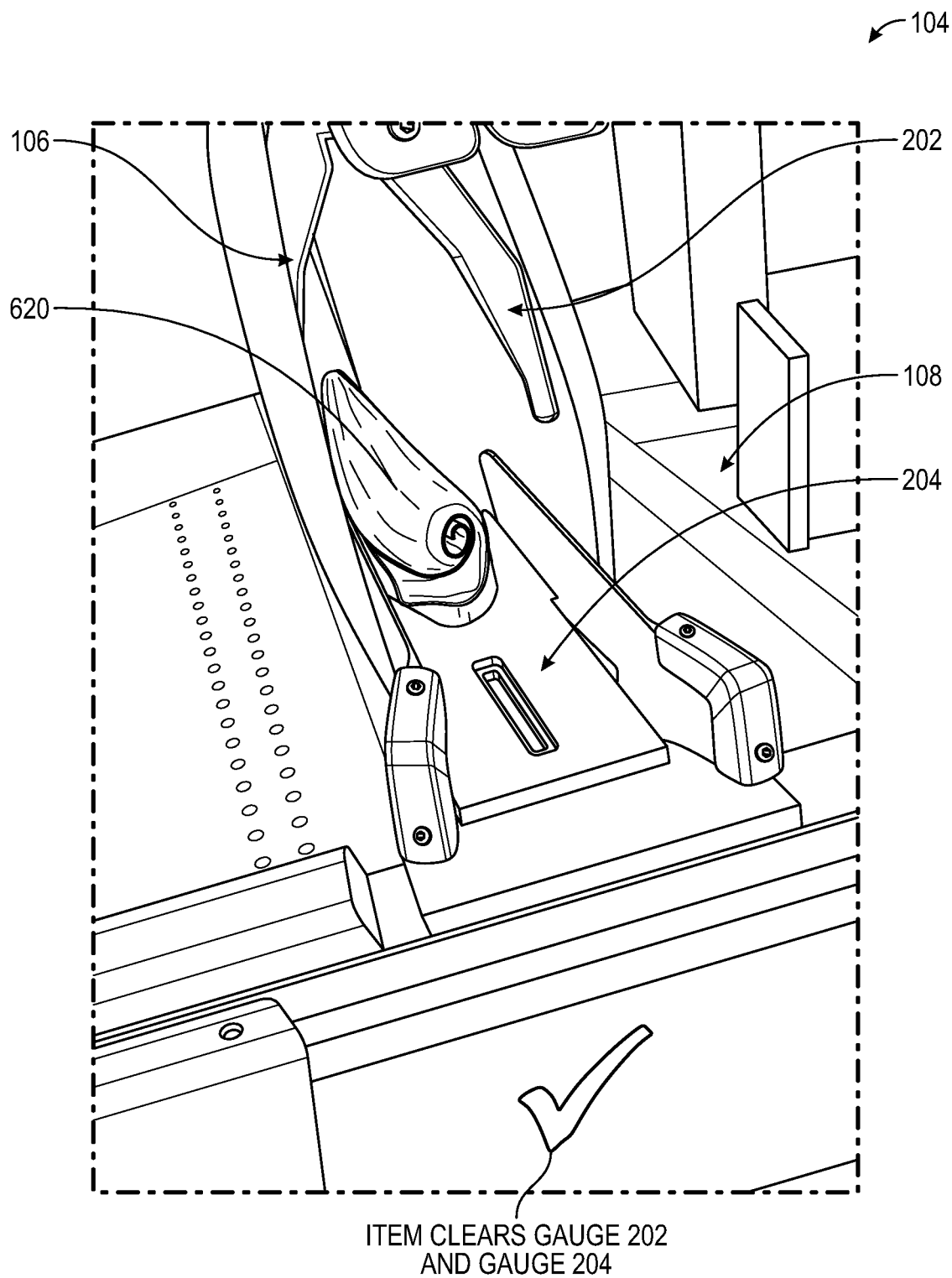

Note that while FIGS. 4A-4D and FIGS. 5A-5D depict items 420 and 520 being boxed-shape, the dimensioning tool 106 described herein can gauge items of a variety of configurations and shapes. FIGS. 6A-6B, for example, illustrate a sequence for using a dimensioning tool 106 to place an irregularly shaped item(s) in a packing machine 108, according to one embodiment. Here, the user may retrieve one or more flexible and soft items 620 (e.g., plastic wrapped items) to place into the packing machine 108 (through the dimensioning tool 106) (FIG. 6A). After placing the item(s) 620 into the packing machine 108, the user confirms that the item(s) 620 clear both gauges 202 and 204, indicating that the packing machine 108 can process the item(s) 620 without forming a defective package.

Figure 7:
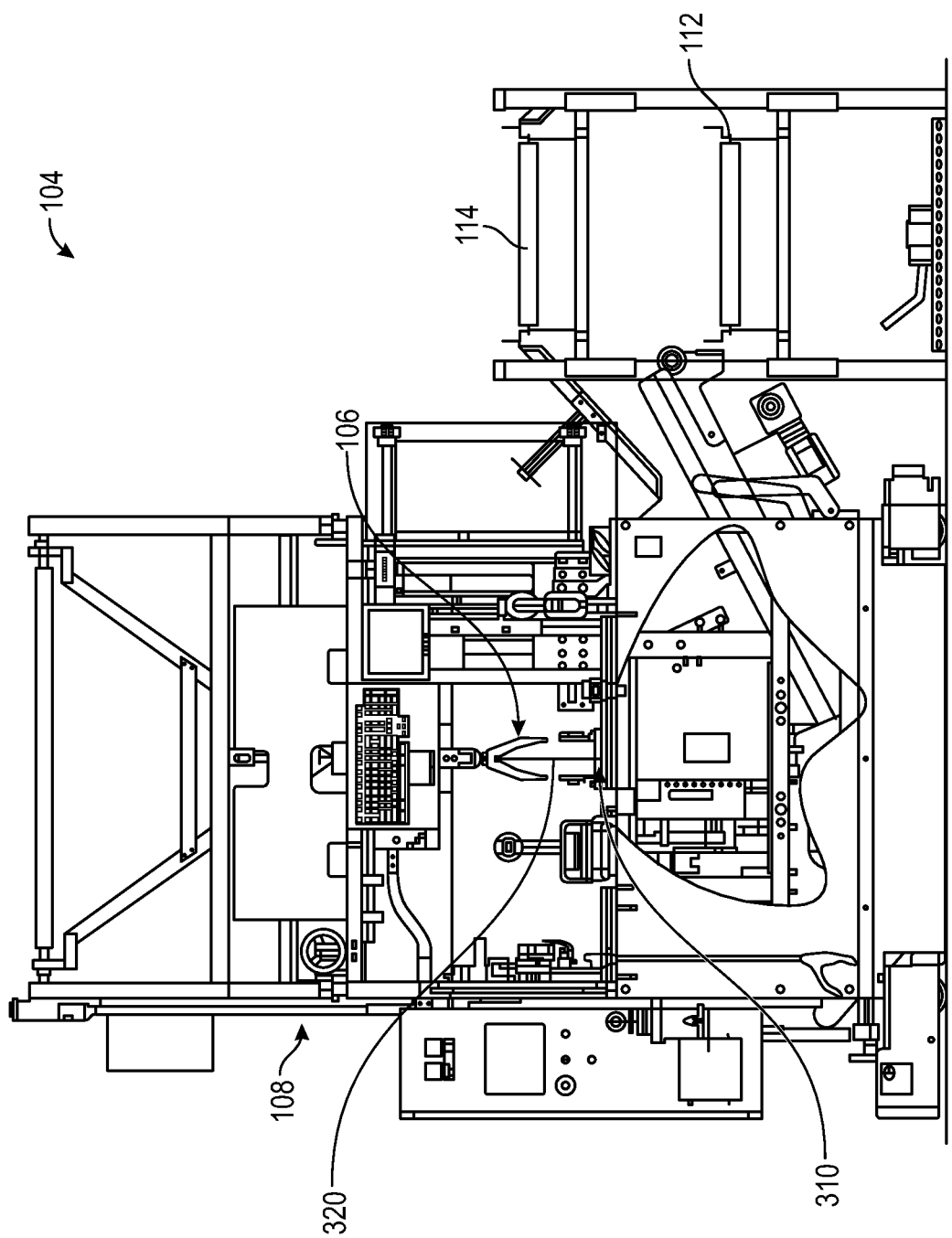
FIG. 7 illustrates an example packing station, according to one embodiment.

FIG. 7 illustrates an example packing station 700 (also referred to as a packing system), according to one embodiment. The packing station 700 may be similar to packing station 104 described above. For example, the packing station 700 may be included within a facility (e.g., facility 100) and used to process items, by packing the items in packaging material in preparation for shipment. As shown, the packing station 700 includes packing machine 108 and dimensioning tool 106, which are described in more detail above. The packing machine 108 includes in-feed tray 310 and bar 320, which are also described in more detail above. In one embodiment, the dimensioning tool 106 is used to determine whether items are improperly sized for the packing machine 108. Additionally or alternatively, in one embodiment, the dimensioning tool 106 is used to determine proper placement of item(s) into the packing machine 108. For items that do not fit within the dimensioning tool 106 (e.g., due to being improperly sized and/or improperly placed), the items may be diverted for re-processing via junction segment 114. On the other hand, items that do fit within the dimensioning tool 106 may be packed by the packing machine 108, and subsequently transitioned via junction segment 112.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A dimensioning tool, comprising:
   a first gauge; and
   a second gauge separate from the first gauge, wherein:
      the first gauge and the second gauge are configured to allow insertion of an item into a packing machine when dimensions of the item are less than or equal to a set of maximum dimensions;
      a first maximum dimension of the set of maximum dimensions corresponds to a width across a surface of the first gauge;
      a second maximum dimension of the set of maximum dimensions corresponds to a distance between a first location along a length of the first gauge and a second location along a length of an in-feed tray of the packing machine;
      a third maximum dimension of the set of maximum dimensions corresponds to a width between a first member of the second gauge and a second member of the second gauge; and a fourth maximum dimension of the set of maximum dimensions corresponds to a vertical distance between the first gauge and the second gauge.

2. The dimensioning tool of claim 1, wherein the set of maximum dimensions is associated with at least one of: (i) a threshold size of the item associated with a predefined threshold level of seal quality of a package comprising the item or (ii) a placement location of the item within the packing machine associated with the predefined threshold level of seal quality of the package.

3. The dimensioning tool of claim 1, wherein the first gauge is configured to restrict two dimensions of the item according to the first and second maximum dimensions.

4. The dimensioning tool of claim 1, wherein the second gauge is configured to restrict two dimensions of the item according to the third and fourth maximum dimensions.

5. The dimensioning tool of claim 1, wherein the first gauge and the second gauge are mounted to the packing machine, such that the first gauge is vertically offset from the second gauge.

6. The dimensioning tool of claim 5, wherein the first gauge and the second gauge are also mounted to the packing machine, such that the first gauge is further horizontally offset from the second gauge.

7. The dimensioning tool of claim 5, wherein the second gauge is disposed above the first gauge.

8. The dimensioning tool of claim 5, wherein:
the first gauge comprises at least one member that extends along a surface of the in-feed tray of the packing machine; and
the second gauge comprises at least one member that extends vertically towards the surface of the in-feed tray.

9. The dimensioning tool of claim 1, wherein the first gauge is offset vertically and horizontally from the second gauge.

10. An apparatus comprising:
a dimensioning tool comprising a first gauge and a second gauge separate from the first gauge, wherein:
the first gauge and the second gauge are configured to allow insertion of an item into a packing machine when at least one of (i) a size of the item is less than or equal to a threshold size associated with a predefined threshold level of seal quality of a package comprising the item or (ii) the item is in a placement location within the packing machine associated with the predefined threshold level of seal quality of the package; and
the first gauge is configured to restrict two dimensions of the item according to (i) a first maximum dimension corresponding to a width across a surface of the first gauge and (ii) a second maximum dimension corresponding to a distance between a first location along a length of the first gauge and a second location along a length of an in-feed tray of the packing machine.

11. The apparatus of claim 10, wherein at least one of the threshold size or the placement location is based on a set of maximum dimensions of an item that can be packaged by the packing machine to meet the predefined threshold level of seal quality.

12. The apparatus of claim 11, wherein:
the set of maximum dimensions comprises the first maximum dimension, the second maximum dimension, a third maximum dimension, and a fourth maximum dimension;
the third maximum dimension corresponds to a width between a first member of the second gauge and a second member of the second gauge; and
the fourth maximum dimension corresponds to a vertical distance between the first gauge and the second gauge.

13. The apparatus of claim 12, wherein the second gauge is configured to restrict two dimensions of the item according to the third and fourth maximum dimensions.

14. The apparatus of claim 10, wherein the first gauge is offset vertically and horizontally from the second gauge.

15. A system comprising:
a packing machine configured to interact with an item; and
a dimensioning tool disposed at the packing machine, the dimensioning tool comprising:
a first gauge; and
a second gauge separate from the first gauge, wherein:
the first gauge and the second gauge are configured to allow insertion of an item into the packing machine when at least one of (i) a size of the item is less than or equal to a threshold size associated with a predefined threshold level of seal quality of a package comprising the item or (ii) the item is in a placement location within the packing machine associated with the predefined threshold level of seal quality of the package; and
the second gauge is configured to restrict two dimensions of the item according to (i) a first maximum dimension corresponding to a width between a first member of the second gauge and a second member of the second gauge and (ii) a second maximum dimension corresponding to a vertical distance between the first gauge and the second gauge.

16. The system of claim 15, wherein at least one of the threshold size or the placement location is based on a set of maximum dimensions of an item that can be packaged by the packing machine to meet the predefined threshold level of seal quality.

17. The system of claim 16, wherein:
the set of maximum dimensions comprises the first maximum dimension, the second maximum dimension, a third maximum dimension, and a fourth maximum dimension;
the third maximum dimension corresponds to a width across a surface of the first gauge; and
the fourth maximum dimension corresponds to a distance between a first location along a length of the first gauge and a second location along a length of an in-feed tray of the packing machine.

18. The system of claim 17, wherein the first gauge is configured to restrict two dimensions of the item according to the third and fourth maximum dimensions.

* * * * *